US012810559B2

(12) United States Patent
Neulander et al.

(10) Patent No.: US 12,810,559 B2
(45) **Date of Patent: *Nov. 24, 2026**

(54) COMPUTING PLATFORM FOR FACILITATING AUGMENTED REALITY EXPERIENCES WITH THIRD PARTY ASSETS

(71) Applicant: c/o Google LLC, Mountain View, CA (US)

(72) Inventors: Ivan Neulander, Los Angeles, CA (US); Ian Joseph Roth, Brooklyn, NY (US); Hao Wang, Long Island City, NY (US); Agustin III Olivan Venezuela, Queens, NY (US); Subramanian Shyamsunder Mathur, New York, NY (US); Xuemei Zhao, Jersey City, NJ (US); Valdrin Koshi, Brooklyn, NY (US); James Sraw Singh, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 18/737,560

(22) Filed: Jun. 7, 2024

(65) Prior Publication Data

US 2024/0320940 A1 Sep. 26, 2024

Related U.S. Application Data

(63) Continuation of application No. 17/993,334, filed on Nov. 23, 2022, now Pat. No. 12,039,679, which is a
(Continued)

(51) Int. Cl.

| | |
|---|---|
| ***G06F 8/36*** | (2018.01) |
| ***G06T 15/80*** | (2011.01) |
| ***G06T 19/00*** | (2011.01) |

(52) U.S. Cl.
CPC .............. *G06T 19/006* (2013.01); *G06F 8/36* (2013.01); *G06T 15/80* (2013.01)

(58) Field of Classification Search
CPC .......... G06T 19/006; G06T 15/80; G06F 8/36
(Continued)

(56) References Cited

U.S. PATENT DOCUMENTS

| | | | |
|---|---|---|---|
| 10,157,593 | B2 | 12/2018 | Witman et al. |
| 10,169,917 | B2 | 1/2019 | Chen et al. |

(Continued)

FOREIGN PATENT DOCUMENTS

| | | |
|---|---|---|
| CN | 103870129 | 6/2014 |
| KR | 2013/0137968 | 12/2013 |

OTHER PUBLICATIONS

Machine Translated Chinese Search Report Corresponding to Application No. 2024111342557 on Dec. 17, 2025.

(Continued)

*Primary Examiner* — Hai Tao Sun
(74) *Attorney, Agent, or Firm* — DORITY & MANNING, P.A.

(57) ABSTRACT

Systems and methods for data asset acquisition and obfuscation can be helpful for retrieving augmented reality rendering data assets from third parties. The sending of a software development kit and receiving back data assets can ensure the data assets are compatible with the augmented reality rendering experience in the user interface. The data acquisition system with obfuscation can also ensure the code generated by third parties is stripped of semantics and has reduced readability.

20 Claims, 11 Drawing Sheets

Related U.S. Application Data continuation of application No. 17/144,002, filed on Jan. 7, 2021, now Pat. No. 11,521,358.

(58) Field of Classification Search
USPC .......................................................... 345/633
See application file for complete search history.

(56) References Cited

U.S. PATENT DOCUMENTS

| | | | | |
|---|---|---|---|---|
| 10,558,426 | B2 | 2/2020 | Kothari et al. | |
| 10,665,011 | B1 | 5/2020 | Sunkavalli et al. | |
| 11,710,224 | B2 | 7/2023 | Toksoz et al. | |
| 2015/0040074 | A1* | 2/2015 | Hofmann | G06T 19/006 715/852 |
| 2015/0082298 | A1* | 3/2015 | Wang | G06F 8/60 717/174 |
| 2016/0163111 | A1 | 6/2016 | Mullins | |
| 2016/0196665 | A1* | 7/2016 | Abreu | G06T 7/251 345/427 |
| 2016/0379381 | A1* | 12/2016 | Krutsch | G06T 1/20 345/426 |
| 2017/0132841 | A1 | 5/2017 | Morrison | |
| 2017/0206708 | A1* | 7/2017 | Gentilin | H04L 67/131 |
| 2018/0232938 | A1 | 8/2018 | Yanev et al. | |
| 2019/0129715 | A1* | 5/2019 | Ding | G06T 19/006 |
| 2020/0150933 | A1* | 5/2020 | Yehuda | G06F 8/41 |
| 2020/0160117 | A1* | 5/2020 | Urtasun | G06V 10/82 |
| 2020/0183969 | A1 | 6/2020 | Wiesel et al. | |

OTHER PUBLICATIONS

Chinese Search Report Corresponding to Application No. 2022800160107 on Jan. 16, 2024.

International Preliminary Report on Patentability for Application No. PCT/US2022/011064, mailed Jul. 20, 2023, 8 pages.

International Search Report and Written Opinion for Application No. PCT/US2022/011064, mailed Mar. 31, 2022, 12 pages.

* cited by examiner

A simplified example of a lipstick effect authored through the Beauty SDK.

COMPUTING PLATFORM FOR FACILITATING AUGMENTED REALITY EXPERIENCES WITH THIRD PARTY ASSETS

PRIORITY CLAIM

The present application is a continuation of U.S. application Ser. No. 17/993,334 having a filing date of Nov. 23, 2022, which is a continuation of U.S. application Ser. No. 17/144,002 having a filing date of Jan. 7, 2021. U.S. application Ser. No. 17/993,334 and U.S. application Ser. No. 17/144,002 are hereby incorporated by reference in their entirety.

FIELD

The present disclosure relates generally to acquisition of data assets. More particularly, the present disclosure relates to the acquisition of data assets from a third party to provide an augmented reality experience to users.

BACKGROUND

Augmented reality (AR) can refer to the creating and execution of interactive experiences of a real-world environment where the objects that reside in the real world are enhanced by computer-generated perceptual information. As one example, an AR experience can include augmenting a scene captured by a user's camera by inserting virtual objects into the scene and/or modifying the appearance of real world objects included in the scene.

Certain entities may provide the ability for a user to engage in an AR experience relative to objects manufactured or distributed by the entity (e.g., an augmented reality "try-ons"). However, most entities provide these AR experiences on their own website only. The limited accessibility for augmented reality product "try-ons" can require consumers to have to go from one website to another website to engage in different AR experiences for different objects (e.g., to try-on different products and compare the products). This problem can cause the consumer to spend much more computing resources navigating among different websites to facilitate engaging in different AR sessions.

Moreover, web-based implementations of augmented reality experiences can lead to lower frame rates and less realistic renderings compared to an augmented reality experience provided in a native application.

Another issue with engaging in different augmented reality experiences is that different AR applications may be coded in different coding languages. Certain coding languages can lead to security issues, which can be particularly concerning when the application is processing an image or video of a user's face.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for providing third party data assets to clients. The method can include sending, by a computing device, a software development kit. The software development kit can include a template for building one or more rendering effect shaders. The method can include receiving, by the computing device, data assets. In some implementations, the data assets can include one or more rendering effect shaders built using the software development kit. The method can include storing, by the computing device, the data assets and providing, by the computing device, an augmented reality rendering experience. In some implementations, augmented reality renderings can be based at least in part on the data assets.

Another example aspect of the present disclosure is directed to a computing system. The computing system can include one or more processors and one or more non-transitory computer readable media that collectively store instructions that, when executed by the one or more processors, cause the computing system to perform operations. The operations can include receiving a software development kit comprising a template for generating an augmented reality experience. The operations can include receiving one or more inputs to modify the template. In some implementations, modifying the template can generate a product-specific augmented reality experience. In some implementations, the operations can include generating data assets based at least in part on the one or more inputs and sending the data assets to a second computing device.

Another example aspect of the present disclosure is directed to one or more non-transitory computer readable media that collectively store instructions that, when executed by the one or more processors, cause the computing system to perform operations. The operations can include sending, by a computing device, a software development kit. In some implementations, the software development kit can include a template for building one or more rendering effect shaders. The operations can include receiving, by the computing device, data assets. The data assets can include one or more rendering effect shaders built using the software development kit. The operations can include storing, by the computing device, the data assets and providing, by the computing device, an augmented reality rendering experience. In some implementations, augmented reality renderings can be based at least in part on the data assets.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
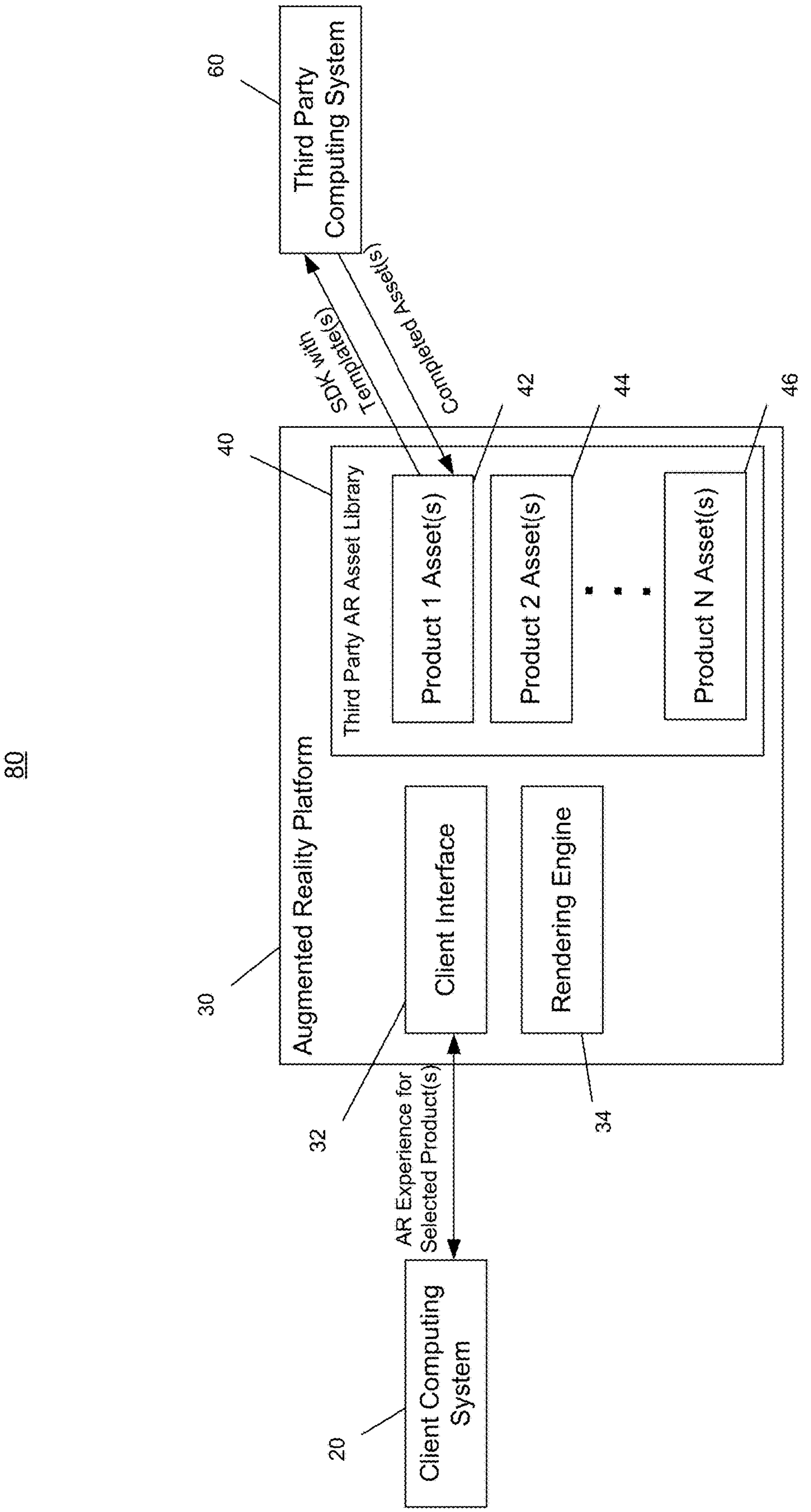
FIG. 1A depicts a block diagram of an example computing system that performs data asset acquisition according to example embodiments of the present disclosure.

Reference numerals that are repeated across plural figures are intended to identify the same features in various implementations.

DETAILED DESCRIPTION

Overview

Generally, the present disclosure is directed to a platform that facilitates the collection of data assets from third parties to provide an augmented reality rendering experience to users. For example, the platform can provide an interface for third parties to build and/or submit rendering effects to be provided to users. The platform may provide an augmented reality rendering experience to users, in which the users can input user data and receive augmented user data as an output. In addition, according to another example aspect, the platform can perform various obfuscation techniques on the received third party data assets to protect third party code.

Thus, example aspects of the present disclosure can provide a system for acquiring third party data assets for augmented reality rendering and obfuscating the acquired code to protect third party proprietary information. In some implementations, the systems and methods can include sending a software development kit to a third party. The software development kit may include a template for building a rendering effect shader. As one example, AR effects can be organized into a shared template and multiple per-product presets. The template can contain shaders and other resources that are common to all products in a particular family (e.g., all lipsticks from a particular vendor). The presets contain parameters corresponding to these shaders, which can include uniform values and textures. The third party can provide data assets back to the platform (e.g., packaged within the SDK). As examples, the data assets can include one or more rendering effect shaders built using the software development kit. The received data assets can then be stored. The data assets can then be used to facilitate an augmented reality rendering experience, in which the data assets can aid in generating an augmented reality try-on experience.

The systems and methods for data asset acquisition can involve one or more systems or devices. The first computing device may be a server, a facilitating computing device, or an intermediary computing device. The second computing device may be a third party computing device. The third party can be a video game company, a product manufacturer, or a product brand. The first computing device and the second computing device can exchange data to generate an augmented reality rendering experience for users. The augmented reality rendering experience can include rendering an augmented reality view that includes one or more products or items. The product may be cosmetics (e.g., lipstick, eye shadow, etc.), furniture or other home goods (e.g., electronic equipment, cookware, glassware, decorations, plants, etc.), clothing, paint colors, automobiles, various electronics, or any other item.

The data asset acquisition can include the first computing device sending a software development kit to the second computing device. The software development kit can include a template for building rendering effect shaders. The software development kit can include example effects, tools to build a rendering effect, and a preview mode to help build an augmented reality rendering. The second computing device can be used to build the rendering effect, and once the rendering effect is built, the second computing device can export the built rendering effect data into a renderable compressed file (e.g., a .ZIP file), which can include data assets needed to recreate the rendering effect. The data assets can then be sent to the first computing device. The first computing device, upon receiving the data assets, can store the data assets for use in an augmented reality rendering experience provided to users. The provided augmented reality rendering experience can be provided to users, where users can input their user data for processing, and the output can be augmented user data that includes the rendering effect built on the second computing device. The user data can be image data or video data captured by a user device. In some implementations, the user data can be a live camera feed.

In some implementations, the one or more rendering effect shaders can include data descriptive of rendering features. One or more rendering effect shaders may be used for rendering a rendering effect for an augmented reality experience. For example, rendering lipstick on a face with augmented reality can include the utilization of a lipstick shader, a texture, uniforms, and a filtering shader. In some implementations, the textures and the uniforms can be input into shaders to aid in generating the rendering effect. In some implementations, the data assets can include the rendering effect shaders. In some implementations, the rendering effect shaders can be processed by a rendering calculator along with the user data to generate a rendered image.

In some implementations, the received data assets can be used to facilitate the generation of augmented reality renderings. A mesh model may be able to process the input data to generate meshes and segmentation masks. An augmentation model may then receive the meshes and segmentation masks and can use the data assets to determine where and how to render a certain rendering. For example, the data assets can include anchoring landmark data. Therefore, the data assets can be used to determine where the rendering needs to occur. In some implementations, the data assets can include shader data. The shader data may be descriptive of lipstick color or eyeshadow color to aid in generation of a make-up augmented reality rendering for the user. Moreover, the shader data may be descriptive of a product's color, glossiness, opacity, and/or various other characteristics.

The augmented reality rendering experience can include a rendering calculator that generates renderings based at least in part on the data assets. In some implementations, the augmented reality rendering experience can include a rendering engine, and the rendering engine can include a rendering calculator.

The augmented reality rendering experience may include a perception subgraph and a rendering subgraph. The perception subgraph can be uniform throughout the system. The perception subgraph may be used with a variety of different rendering subgraphs. The rendering subgraph can be built by a third party to generate a rendering effect to provide to a user. The rendering subgraph may be built then used by the augmented reality rendering experience platform that stores the perception subgraph. The rendering subgraph may vary depending on the rendering effect and the third party. In some implementations, a single perception subgraph can be used with multiple rendering subgraphs to render multiple renderings in an augmented user image or video. For example, a picture or video of a user's face can be processed to generate an augmented reality rendering of lipstick, eyeshadow, and mascara on the face. The processing may include a singular perception subgraph but a rendering subgraph for each respective product (i.e., lipstick, eye shadow, and mascara).

In some implementations, the data assets can include product data descriptive of a product sold by a third party. In some implementations, the systems and methods disclosed herein can be used to compile product augmented reality rendering experiences for retailers to allow consumers to have virtual try-ons of different products from a variety of different brands or providers. The retailer can be an online retailer, in which the consumer can virtually try-on products in the comfort of their own home. In some implementations, the retailer can be a physical store retailer, in which the augmented reality experience can be enabled through a mobile application or a computing device found inside the store. In some implementations, the systems and methods disclosed herein can enable an augmented reality rendering experience inside a search engine application, in which a consumer may search for a brand of a product, a type of product, a color of a product, etc., and the search engine can provide results based on the search query, in which the results include an option to try-on a determined result using augmented reality.

In some implementations, the received data assets can allow for the generation of a variety of augmented reality experiences. For example, the data assets can include data assets generated by a manufacturer, distributor, seller, etc. of furniture or other home goods to aid in rendering one or more of their products inside of a home. In this implementation, the third party may modify and fine-tune the software development kit to be able to generate a furniture or other home goods augmented reality experience. When the third party is satisfied with generated experience, they may export and send the data assets to the facilitating system/platform to store. The facilitating system can then use the data assets to enable the augmented reality rendering experience accessible to users.

The augmented reality rendering can be generated by receiving user data, processing the user data with an encoder model to generate a user mesh, and processing the user mesh with an augmentation model to generate the augmented reality rendering. In some implementations, the mesh can be a polygonal mesh. In some implementations, the augmentation model can include shaders based at least in part on the data assets. In some implementations, the augmentation model can generate the augmented reality rendering by rendering the polygonal mesh using custom shaders, superimposed over the camera feed image.

In some implementations, the systems and methods can include a third party computing device intaking and modifying a software development kit. The method can include receiving a software development kit configured to be modified to generate an augmented reality experience. Furthermore, the method can include receiving one or more inputs to modify the software development kit, in which modifying the software development kit generates a product-specific augmented reality experience. The method can include generating data assets based at least in part on the one or more input and sending the data assets to a second computing device.

In some implementations, the third party computing device may test the augmented reality experience for fine-tuning. Testing the augmented reality experience can include comparing rendered images and pre-rendered reference ("golden") images. Alternatively, in some implementations, testing can include obtaining training data, processing the training data with the augmented reality experience to generate augmented reality media, and comparing the augmented reality media and reference data. One or more parameters of the data assets can be adjusted (e.g., automatically using a machine learning algorithm) based at least in part on the comparison (e.g., based on a loss function that compares the augmented reality media and the reference data).

In some implementations, the systems and methods may process the received data assets to obfuscate the code. The obfuscation can include removing whitespace from the code, removing one or more comments from the code, and renaming terms and symbols in the code. The one or more comments may be removed, because the one or more comments may include text descriptive of code semantics. Renaming one or more terms in the data asset's code can include uniform renaming across files. The uniform renaming process can include indexing terms to provide a reference for future renaming uniformity. In some implementations, the renaming can include using hashing functions. Hashing may be indexed in a global registry or an index table. New symbols may be actively added to the index as received. The renamed terms and symbols may be deterministic terms. In some implementations, the system can rename symbols such as function names that are shared among multiple files.

Renaming can include parsing the shader code and isolating the specific declarations for replacement. Stripping whitespace can remove the organization of the code to remove some logic included in formatting code in certain ways. Obfuscation can include removing semantic content that could include shader information (e.g., proprietary information found in OpenGL code, GLSL, or other native sources) the third party does not want to make public.

In some implementations, the platform can be used for generating a directory of product renderings. The directory of augmented reality renderings can be implemented to provide the renderings for advertisements, video web applications, or mobile apps. In some implementations, shared code may be integrated into the directory as a library dependency.

Receiving or ingesting the data assets can occur through a variety of methods. In some implementations, the ingestion can occur through a built in export function in the platform. In other implementations, the data assets can be delivered through emailing a single effect template, parameterized by shader uniforms defined in a single top-level file. For example, for a lipstick rendering, the third party can send shader uniform values for each lipstick product they want provided to a user. The systems and methods can combine the effect template and per-product shader uniforms, producing an AR effect (e.g., a beauty effect) per product. In some implementations, the data assets can be ingested through an internet-based data feed instead of email. Data assets can be ingested individually or en masse.

In some implementations, the software development kit can be configured for different product types. For example, a software development kit for building data assets for rendering a lipstick can include different templates and presets compared to a software development kit for building data assets for rendering a couch. Moreover, the organization of beauty effects into a shared "template" and multiple per-product presets can aid third parties in building data assets for rendering certain products. The template can contain shaders and other resources that are common to all products in a particular family (e.g., all lipsticks from vendor A). The presets can contain parameters corresponding to these shaders, which can include uniform values and textures.

In some implementations, the systems and methods disclosed herein can be implemented as a native application. The native application can provide the client with an augmented reality rendering experience that includes third party product renderings for selection by a client.

The systems and methods disclosed herein may also be applicable to other technologies, including mixed reality. In some implementations, third parties can use the software development kit to build interactive renderings. For example, a furniture brand may build various rendering effects for their various recliners and various expandable tables. The rendering effect shaders can be transferred to the augmented reality rendering experience platform to provide a mixed reality rendering experience, in which the user can render the furniture in their home. The user can then interact with the renderings to see a rendering of the furniture in their default position and in their alternative position. Therefore, a user can test out how a recliner may fit in their home in the up-right position and in the reclined position. The user can use the mixed reality experience to determine if the expanded table fits in a given room.

Furthermore, the platform of data asset acquisition and obfuscation can be applied to a variety of other platforms for generating supported user experiences. The platform for data acquisition can be utilized for supported application creation, embedded feature creation, and widget creation.

Moreover, in some implementations, the systems and methods may be used as a visual compatibility calculator. For example, the systems and methods can be used to ensure a certain product or part will fit in the desired space or location. The systems and methods can be used to virtually test-out the measurements/size of a product using virtual reality. The third party can provide data assets that includes data descriptive of the measurements of a product. The data assets can then be used to provide an augmented reality rendering experience to a user in which a product is rendered according to the measurements provided by the third party. This aspect can allow consumers to "try-on" products to visualize the space the product may take-up.

The systems and methods of the present disclosure provide a number of technical effects and benefits. As one example, the system and methods can receive parameters for augmented reality from third parties to allow clients to virtually see a product in application. The systems and methods can further be used to ensure the security of the provided data from third parties. Furthermore, the systems and methods can enable the centralized collection of augmented reality data sets for virtual try-ons from a variety of vendors to allow a user to try on products from multiple vendors without having to navigate from website to website or from proprietary application to proprietary application.

Furthermore, in some implementations, the disclosed systems and methods can be implemented into a native application. The implementation of the systems and methods in a native application can provide a higher frame rates and more realistic renderings compared to the web-application alternative.

Another technical benefit of the systems and methods of the present disclosure is the ability to obfuscate code (e.g., shader code). The systems and methods can cause the code to become clustered without comments or symbols that divulge proprietary information found in the originally provided source code. As the systems and methods can also obfuscate the received data assets, the third parties can provide their data without divulging certain proprietary information.

With reference now to the Figures, example embodiments of the present disclosure will be discussed in further detail.

Example Devices and Systems

FIG. 1A depicts a block diagram of an example computing system 80 that performs data asset acquisition according to example embodiments of the present disclosure. The system 80 includes a client computing system 20, an augmented reality platform 30, and a third party computing system.

As illustrated in FIG. 1A, the augmented reality platform 30 can communicate with the third party computing system 60 to generate a third party-augmented reality (AR) asset library 40. The third party AR asset library 40 can be leveraged to provide an augmented reality (AR) experience to a client computing system 20 via a client interface 32.

For example, the augmented reality platform 30 can provide a software development kit (SDK) with templates to the third party computing system 60. The third party computing system 60 can use the SDK with templates to build augmented reality rendering effects descriptive of products sold by the third party. The completed rendering effects can be provided back to the augmented reality platform 30 as completed data assets. Each completed data asset can be stored in the augmented reality platform's 30 third party AR asset library 40. The stored product assets in the third party AR asset library 40 can be from a singular third party or from a plethora of third parties. For example, Product 1 Assets 42, Product 2 Assets 44, all the way to Product N Assets 46 can be from a singular third party computing system and can include a variety of products provided by the third party. Alternatively, Product 1 Assets 42 and Product 2 Assets 44 can be provided by different third parties and can include data assets descriptive of different products from different brands.

The augmented reality platform 30 can intake client data via the client interface 32 to be processed by the rendering engine 34 to provide an AR experience to the client computing system 20. The rendering engine 34 can process the client data with a perception model and an augmentation model. The perception model can output one or more meshes and one or more segmentation masks that can be input into the augmentation model. The augmentation model can process the client data, the one or more meshes, and the one or more segmentation masks to output an augmented reality client image or video, which can be sent to the client computing system 20 via the client interface 32.

In some implementations, the AR experience can include the client computing system 20 sending a selection to the augmented reality platform 30 to indicate a desired product to “try-on.” The augmented reality platform can use the stored data asset from the third party AR asset library 40 to render the product in a client provided image or video by parameterizing the augmentation model of the rendering engine 34 using the data assets. For example, the client computing system 20 may use the client interface 32 to select Product 1 to virtually try-on. Product 1 Assets 42 can be provided to the rendering engine 34 along with a set of client data. The rendering engine 34 can process the set of client data and the Product 1 Assets 42 to generate images or video of Product 1 in the images or video provided by the client computing system 20.

Figure 1B:
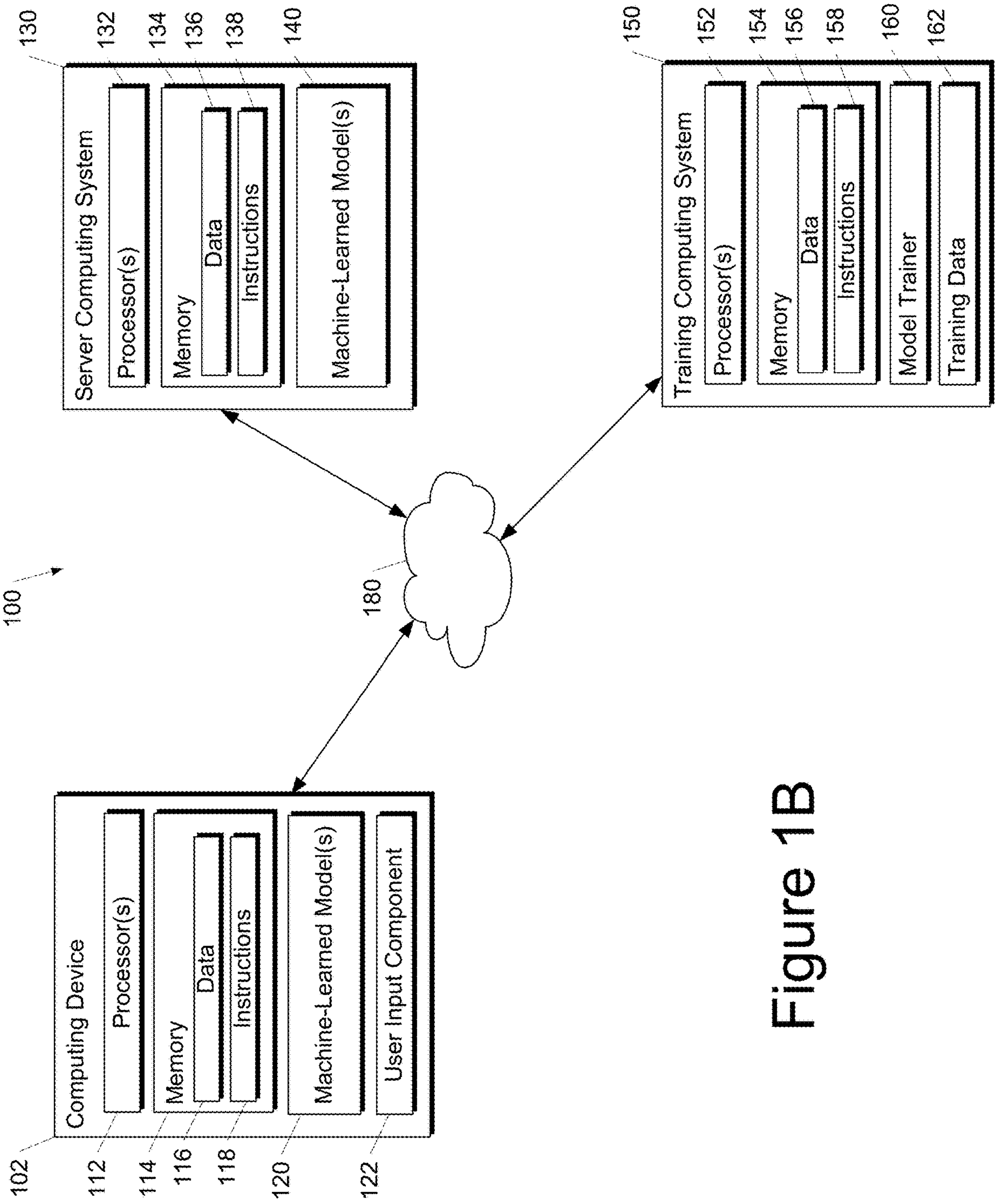
FIG. 1B depicts a block diagram of an example computing system that performs data asset acquisition and obfuscation according to example embodiments of the present disclosure.

FIG. 1B depicts a block diagram of an example computing system 100 that performs data asset acquisition and obfuscation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more augmented reality rendering models 120. For example, the augmented reality rendering models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example augmented reality rendering models 120 are discussed with reference to FIGS. 2 and 4.

In some implementations, the one or more augmented reality rendering models 120 can include data assets received from the training computing system 150 over network 180, stored in the user computing device memory 114, and then used or otherwise implemented by the one or more processors 112. In some implementations, the user computing device 102 can implement multiple parallel instances of a single augmented reality rendering model 120 (e.g., to perform parallel renderings of effects).

More particularly, the server computing system 130 and the training computing system 150 can exchange data to generate data assets that can enable the augmented reality rendering models to process image or video data and output augmented image data or augmented video data.

Additionally or alternatively, one or more augmented reality rendering models 140 can be included in or otherwise stored and implemented by the server computing system 130 that communicates with the user computing device 102 according to a client-server relationship. For example, the augmented reality rendering models 140 can be implemented by the server computing system 140 as a portion of a web service (e.g., a “live try-on” service for make-up, clothing, electronics, automobiles, or furniture or other home goods). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned augmented reality rendering models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 and 4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the augmented reality rendering models 120 and/or 140 based on a set of training data 162. The training data 162 can include, for example, shaders built by a third party with a software development kit, in which the third party received the software development kit from a facilitating computing device or the server computing system 130. The third party may have generated the shaders and the data assets by building and testing augmented reality experiences with the software development kit.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). In another example, the input includes visual data (e.g., one or more images or videos), the output comprises compressed visual data, and the task is a visual data compression task. In another example, the task may comprise generating an embedding for input data (e.g., visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1B illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1C:
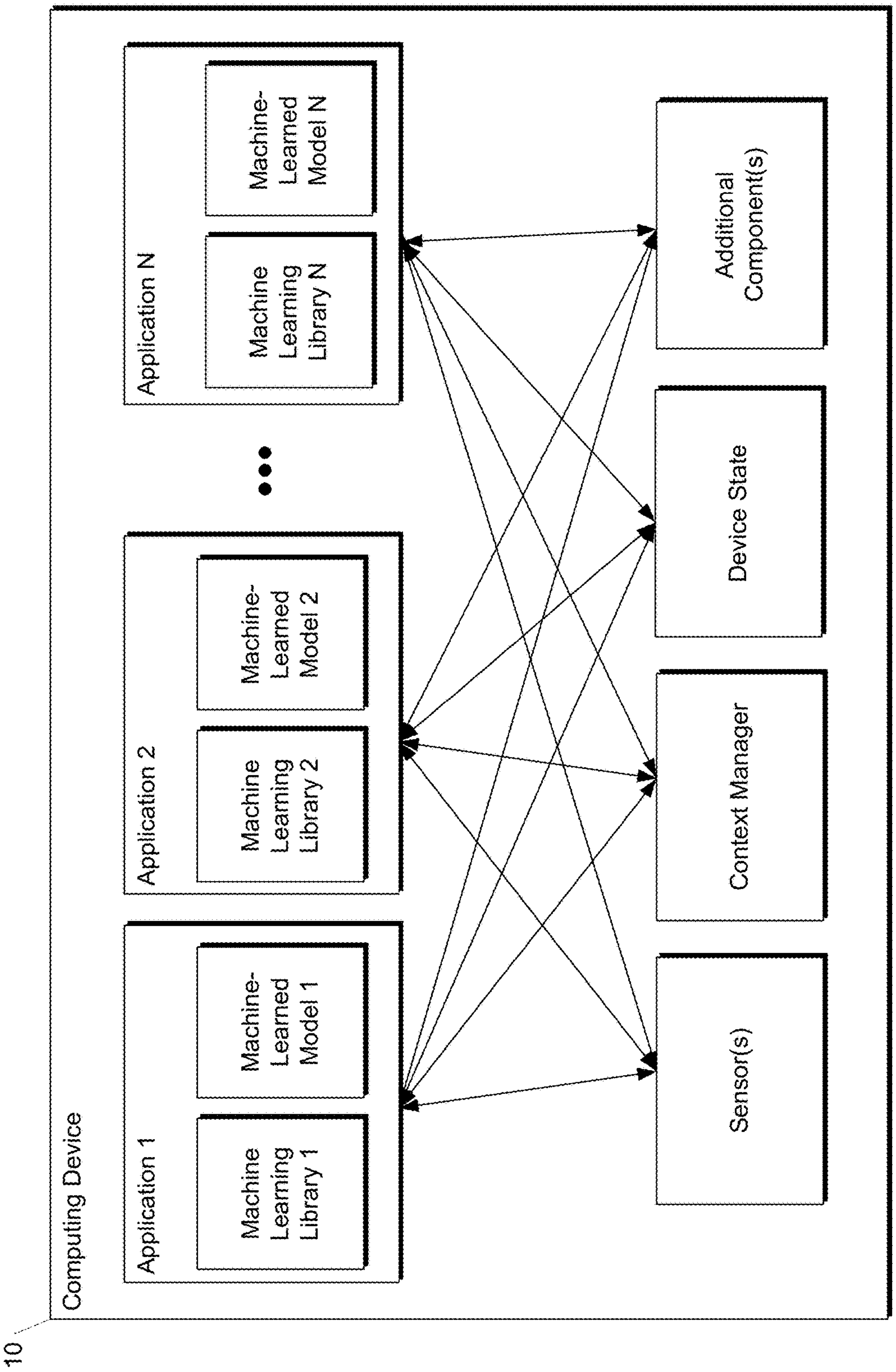
FIG. 1C depicts a block diagram of an example computing device that performs data asset acquisition and obfuscation according to example embodiments of the present disclosure.

FIG. 1C depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1C, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1D:
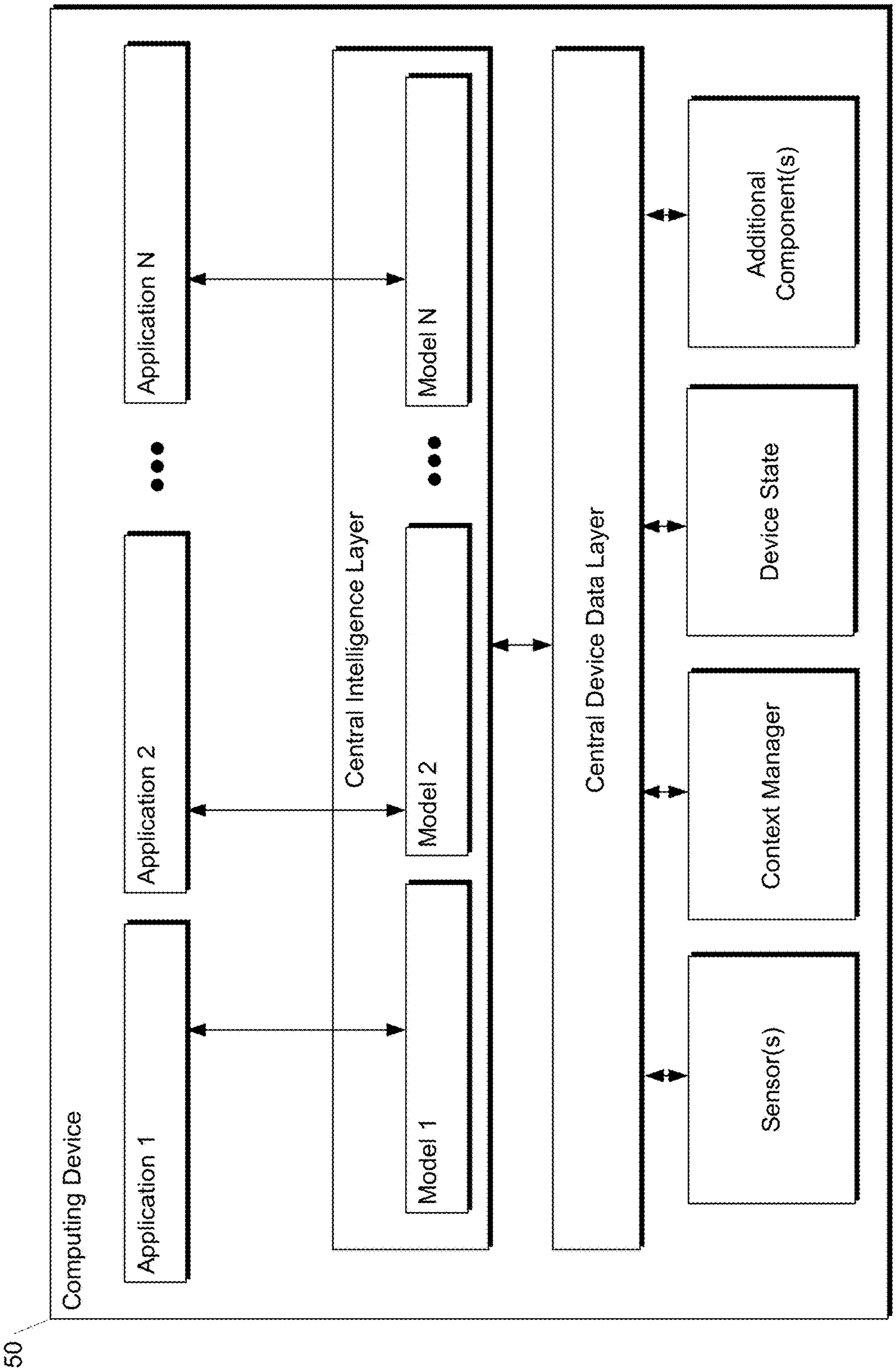
FIG. 1D depicts a block diagram of an example computing device that performs data asset acquisition and obfuscation according to example embodiments of the present disclosure.

FIG. 1D depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1D, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1D, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

In some implementations, the systems and methods can be used as a rendering pipeline. The pipeline can include a software development kit (SDK) that can include all the tools needed to build a renderable compressed file (e.g., a ZIP file). In some implementations, the software development kit with the compressed file (e.g., a ZIP file) can be tested with viewers on various platforms. The source assets generated while building with the software development kit can be used to augment still images or video.

The software development kit can be sent to a third party. The third party can build and preview inward-facing rendering pipelines. The pipelines can be used for a variety of uses including, but not limited to, beauty product try-ons with a computer or a mobile device.

The software development kit can include a script with associated binaries, a set of preview tools, documentation, and a set of sample effects. The script and associated binaries can be used for compiling product effect sources into renderable compressed files. The set of preview tools can be used for visualizing the rendered results. Moreover, the preview tools can provide a joint interface for editing and preview, or a quick interface switch between the two. Documentation can include raw HTML or other forms of documentation for review to aid in the building process. The set of sample effects can aid the third parties in understanding the software development kit, while providing baselines.

The software development kit can be designed to be self-sufficient, easy to port, able to run on stock hardware, be fast, and be secure. The software development kit can be designed to run without dependencies to allow for third parties or other creators to build renderings using the software development kit without having to rely on other applications. The back-end can mirror the back-end used by the system interfacing with the consumers. Moreover, the easy porting can allow for third parties to use their existing shaders with minimal to no modification. Furthermore, the software development kit can be designed to run on a variety of operating systems without requiring software installation outside of the software development kit. In some implementations, the software development kit can include features that allow for opening up render graphs and GPU shaders for customization. The interface can eliminate the need for implementing third party GPU code into the system interfacing with the consumer, which can maintain security for the user. The software development kit can use a rendering calculator to transform incoming data into outgoing data.

Inward-facing augmented reality effect generation can involve two components. The first component can involve perception. The perception component can compute and output pixel coordinates of landmarks in an image (e.g., lips on a face). The second component can involve a rendering component. The rendering component can include rendering the augmented reality effect on the original received frame with the computed landmarks facilitating the location. The result can then be output.

Graphs for augmented reality rendering can be divided into a third party subgraph and a facilitator subgraph. The facilitator subgraph can be a perception subgraph, while the third party subgraph can be a rendering subgraph that can be edited by both the third party and the facilitator. The separation can allow for modification of the perception subgraph by the facilitator without affecting the rendering subgraph. Moreover, the separation can allow for a single perception subgraph to be used even if multiple augmented reality effects are being rendered. Therefore, multiple rendering subgraphs may be layered on a single perception subgraph to produce multiple renderings with the computation of a single perception model process.

The aggregation of a perception subgraph and a rendering subgraph can produce a complete graph or augmented reality media.

A third party effect source can contain the rendering subgraph file and one or more directories of assets consumed by the rendering calculators in the subgraph.

In some implementations, the software development kit may include a perception model. The software development kit can invoke bundled binaries to convert each type of source file into a processed format, that can preserve the input's directory structure in the generated renderable compressed file, while emitting any errors encountered along the way. Asset files such as graph protos, shaders, and blueprints may reference other files that can be included in the software development kit or are part of the effect source. Textures can be converted into webp format based on a per-effect image_conversion.txt file that customizes the conversions.

In some implementations, product effects built with the software development kit can contain GLSL shaders that can be served onto users' devices for runtime compilation. These shaders can represent valuable intellectual property from third party tech providers. The systems and methods disclosed herein can obfuscate the shaders to aid in protecting the information. Obfuscation can include stripping comments and syntactically superfluous whitespace, and then systematically renaming most non-reserved symbols so as to obscure semantics. In some implementations, the obfuscated symbols can be obfuscated uniformly amongst files. The obfuscation can occur after inspecting and testing the original shaders obtained from third party partners.

The systems and methods can be applied to a variety of augmented reality renderings including, but not limited to, make-up renderings, furniture renderings, apparel renderings, video game renderings, and building structure renderings.

Figure 2:
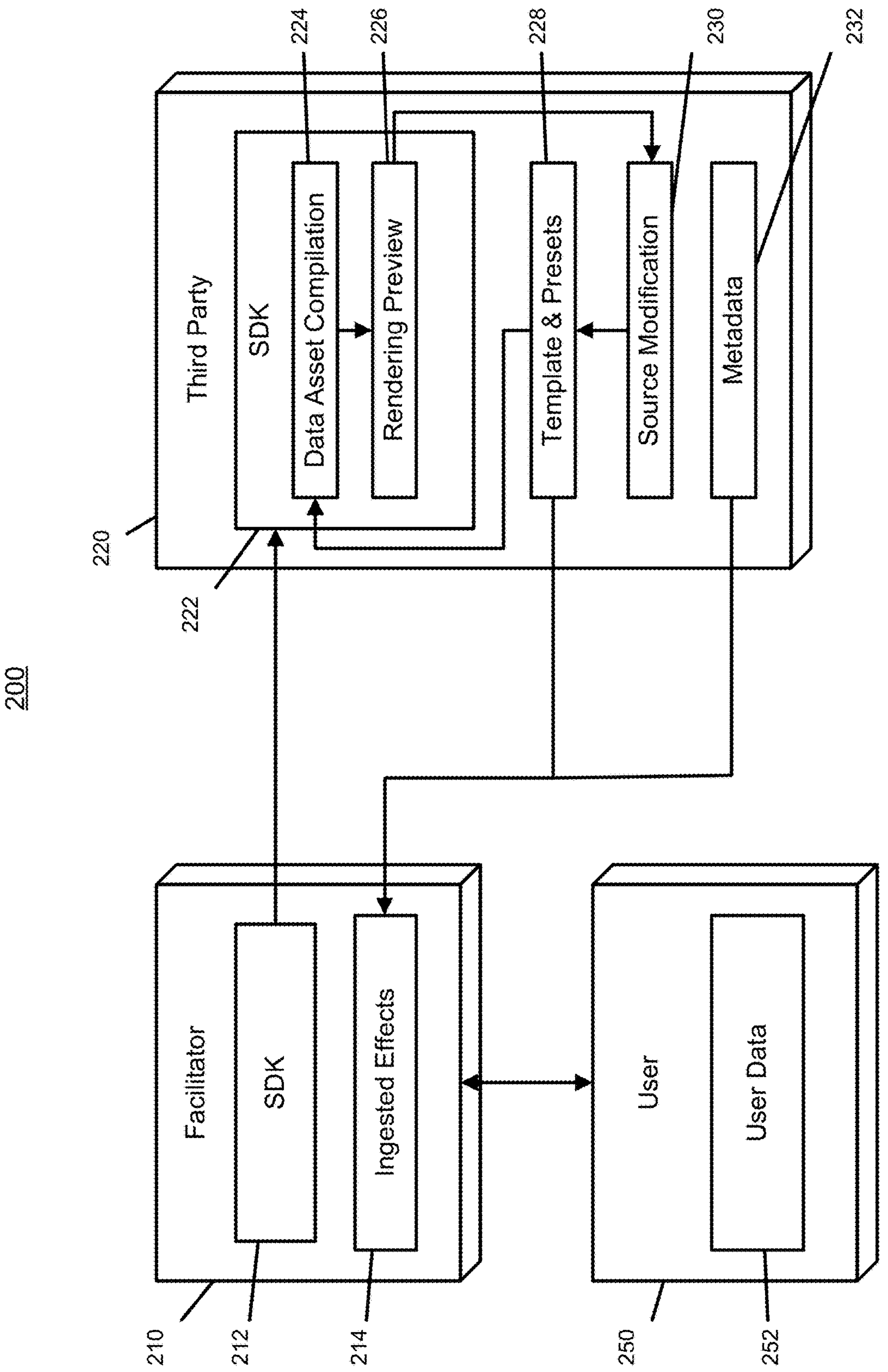
FIG. 2 depicts a block diagram of an example data asset acquisition system according to example embodiments of the present disclosure.

FIG. 2 depicts a block diagram of an example data asset acquisition system 200 according to example embodiments of the present disclosure. In some implementations, the data asset acquisition system 200 is trained to send a software development kit 212 for building an augmented reality rendering experience and, as a result of sending the software development kit 212, receive templates and presets 228 from a third party. Thus, in some implementations, the data acquisition system 200 can include a facilitator 210, a third party 220, and a user 250.

In particular, FIG. 2 depicts a system for data asset acquisition for use in generating an augmented reality rendering experience. A facilitator 210 can be a facilitating system for compiling data assets for augmented reality rendering by communicating with third parties 220. The facilitator 210 can be a server, a web application, or a facilitating computing system. When the facilitator 210 has received a data asset, the facilitating system can provide an augmented reality rendering experience to a user 250.

The data asset acquisition can include a facilitator built software development kit (SDK) 212 being sent to a third party 220. The third party can use the software development kit 222 to build rendering experiences. The software development kit 222 can compile the data assets 224 and can allow for rendering previews 226 of the generated rendering experiences.

The third party 220 may use the rendering preview to determine what, if any, source modifications 230 need to be made to the templates and presets 228 of their data assets. When building, testing, and fine-tuning is completed, the third party can send their data assets to the facilitating system, including the templates and presets 228 along with third party metadata 232. The facilitating system 210 can ingest the effects 214 and store them for later providing an augmented reality rendering experience that can include the rendering effects built by the third party 220. The facilitator can intake user data 252 from the user 250 and can output augmented user data with the rendering effect included in the augmented user data.

Figure 3:
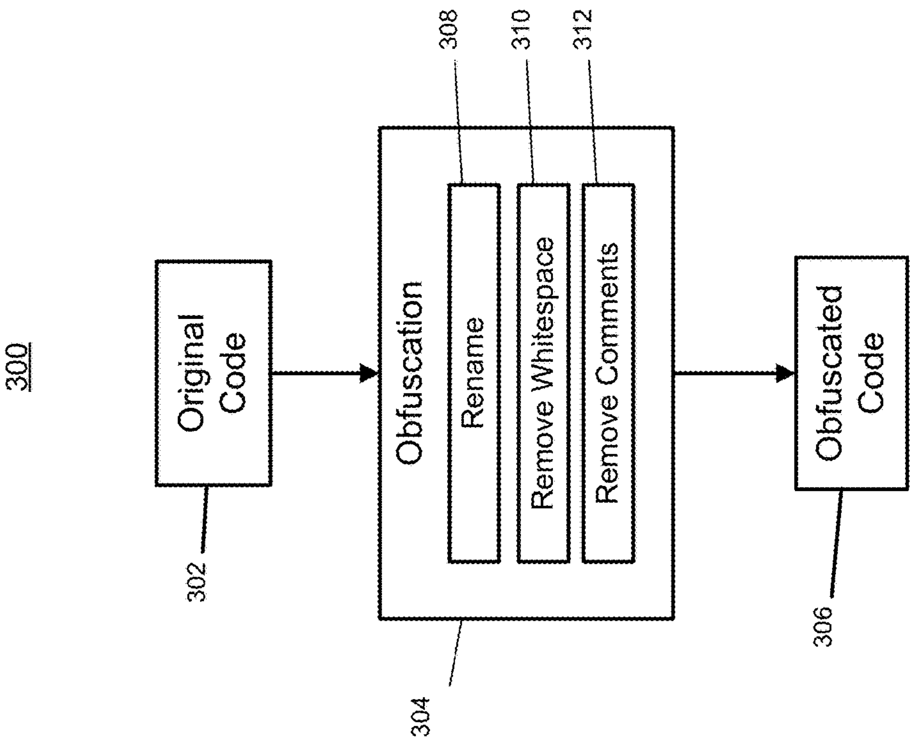
FIG. 3 depicts a block diagram of an example obfuscation according to example embodiments of the present disclosure.

FIG. 3 depicts a block diagram of an example obfuscation 300 according to example embodiments of the present disclosure. The obfuscation 300 can be included in the data asset acquisition system 200 of FIG. 2 to obfuscate the data assets.

More particularly, FIG. 3 depicts a three pronged approach to obfuscation. In this implementation, the original code 302 can be obfuscated with an obfuscation system 304 to generate obfuscated code 306. In some implementations, the original code 302 can be data asset code for augmented reality renderings.

Furthermore, in this implementation, the obfuscation system 304 can include renaming 308 symbols or terms, removing whitespace 310, and removing comments 312 pertaining to semantics.

Renaming 308 can include indexing symbols and terms from the original code and replacing the original symbols and terms with assigned symbols and terms. In some implementations, renaming 308 can include the utilization of hashing functions. The renaming can be uniform throughout different files.

Removing whitespace 310 can include removing indentations, blank lines, and returns. The removal of whitespace can obscure the logical format of code making the code harder to read.

Removing comments 312 can include removing one or more comments that relate to code semantics. The obfuscation system may process the code and determine if comments are semantic comments. If a comment serves to explain code semantics, that comment can be removed.

These three components can decrease readability of the code while also hiding third party symbols and terms.

Figure 4:
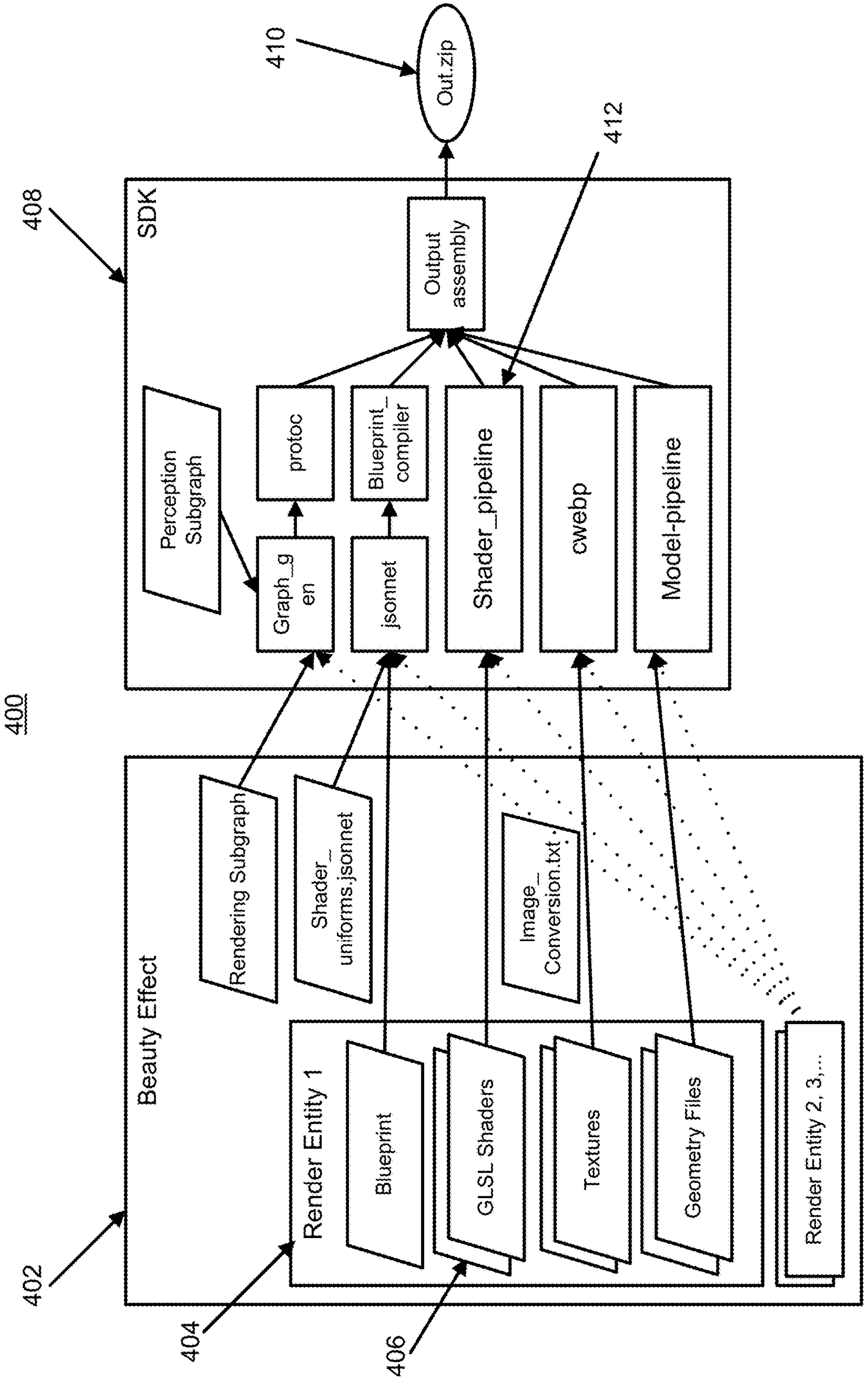
FIG. 4 depicts a block diagram of an example data asset acquisition system according to example embodiments of the present disclosure.

FIG. 4 depicts a block diagram of an example data asset acquisition system 400 according to example embodiments of the present disclosure. The data asset acquisition system 400 is similar to data asset acquisition system 200 of FIG. 2 except that data asset acquisition system 400 can be specifically configured for beauty effect renderings.

In this implementation, the beauty effect 402 can include a make-up rendering. The beauty effect can include different data sets. The data sets can include a render entity 404 data sets with blueprints, GLSL Shaders 406, textures, and geometry files. The beauty effect 402 can further include rendering subgraphs, shader uniforms, and image conversions. These data sets can be input into the software development kit 408 to build an augmented reality rendering experience. The software development kit 408 can allow the builder to preview and test the newly built experience. In particular the GLSL shaders 406 of the beauty effect can be converted into a shader pipeline inside the software development kit. The built augmented reality rendering experience can parallel the previously existing beauty effect 402 rendering experience outside of the software development kit 408. When the build is complete the software development kit can generate a renderable zip file 410 for use in recreating the augmented reality rendering experience on another device.

Figure 5:
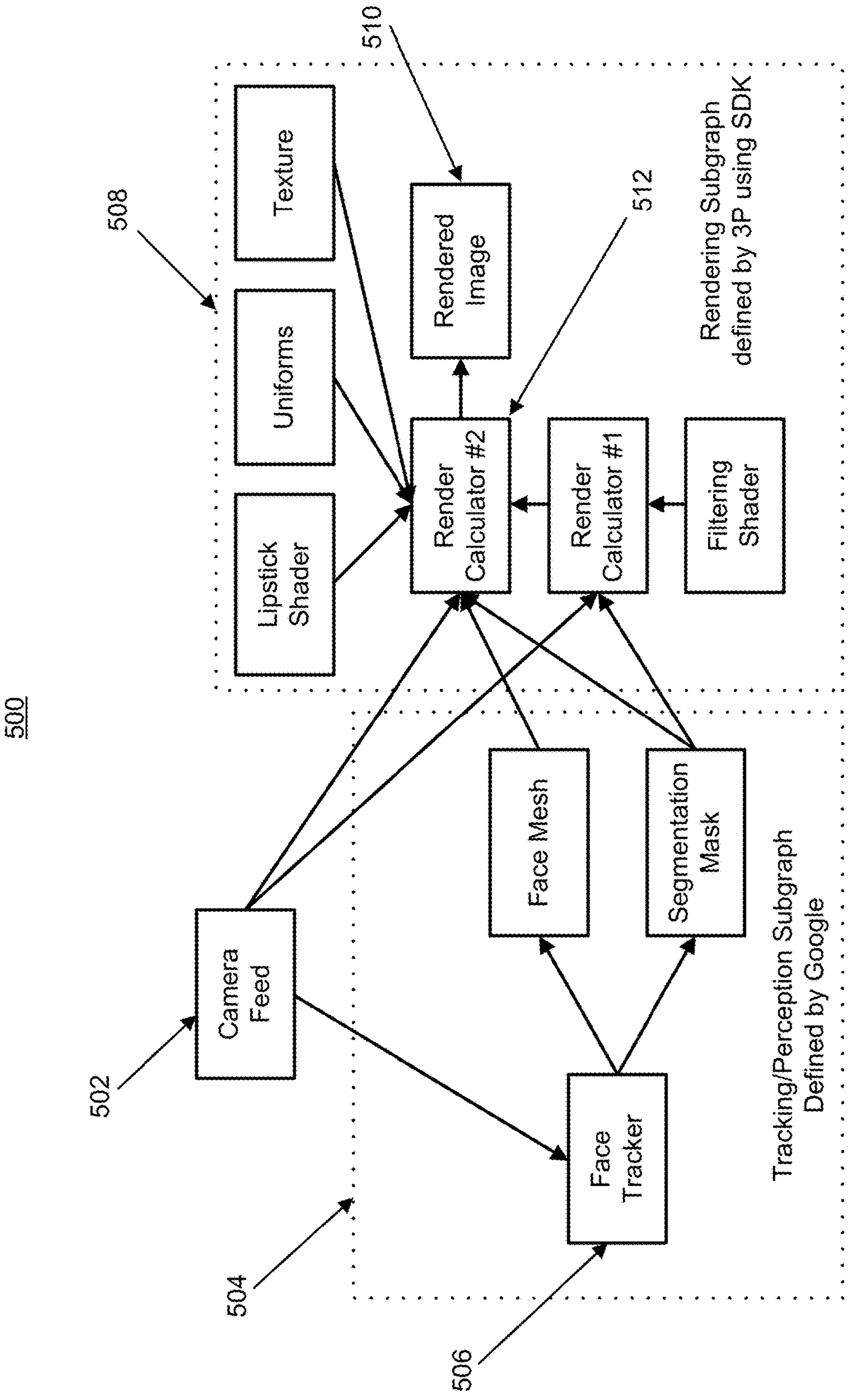
FIG. 5 depicts a block diagram of an example data asset acquisition system according to example embodiments of the present disclosure.

FIG. 5 depicts a block diagram of an example augmented reality rendering experience model 500 according to example embodiments of the present disclosure. The augmented reality rendering experience model 500 is similar to data asset acquisition system 200 of FIG. 2 except that augmented reality rendering experience model 500 further includes the processing of a camera feed with a mesh model and an augmentation model with the augmentation model using the generated data assets.

In particular, FIG. 5 depicts an example perception subgraph 504 and an example rendering subgraph 508 being used to process a camera feed 502 to generate a rendered image 510. The perception subgraph 504 can process the camera feed 502 with a mesh model 506 to generate a mesh and a segmentation mask. The mesh and the segmentation mask can be processed by rendering calculators 512. The rendering calculators 512 can be included in the rendering subgraph 508 and can be influenced by shaders. The mesh, the segmentation mask, and the camera feed 502 can be processed by the rendering calculators 512 to generate a rendered image. The rendered image can include an augmented reality rendering. The rendering can be a rendering generated by a third party using a software development kit. Moreover, in some implementations, the rendering can be a make-up rendering, in which the mesh model can be a face tracker, the shaders can include a lipstick shader, a texture shader, a uniform shader, and/or a filtering shader.

Example Methods

Figure 6:
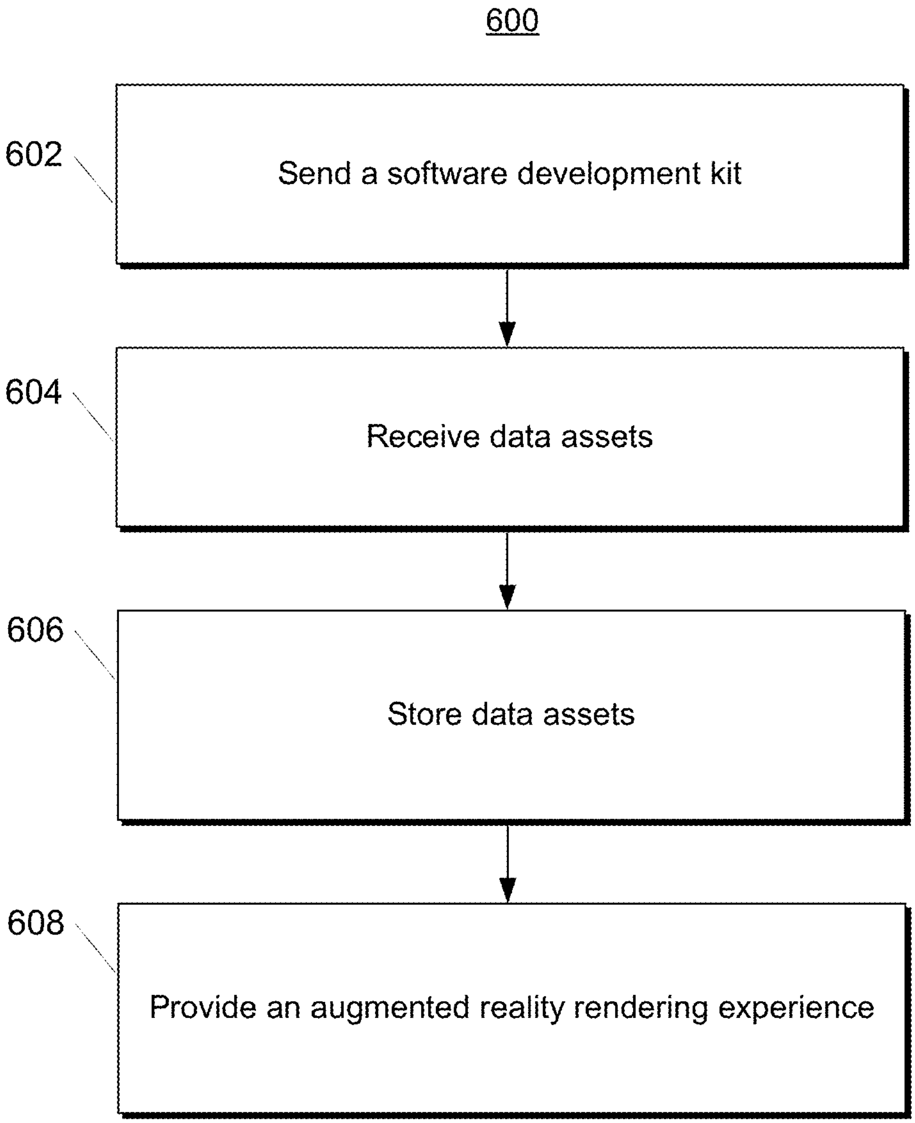
FIG. 6 depicts a flow chart diagram of an example method to perform data asset acquisition according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can send a software development kit. In some implementations, the software development kit can include a template for building one or more rendering effect shaders. The software development kit may include a script and associated binaries for compiling source effects into renderable files. The software development kit may further include preview tools for the configuring third party to preview their render build during the build for fine-tuning and testing. In some implementations, the software development kit can include documentation and sample effects for aiding the third party in how to build and fine-tune effects with the software development kit.

At 604, the computing system can receive data assets. In some implementations, the data assets can include one or more rendering effect shaders built using the software development kit. The data assets can be received in the form of a renderable file (e.g., a .ZIP file). The data assets can include shader data for rendering a product or item sold or provided by a third party. The product may be cosmetics (e.g., lipstick, eye shadow, etc.) furniture or other home goods (e.g., electronic equipment, cookware, glassware, decorations, plants, etc.), clothing, paint colors, automobiles, or any other item.

At 606, the computing system can store the data assets. The data assets can be stored on a server, a user computing device, or a facilitator computing device.

At 608, the computing system can provide an augmented reality rendering experience. In some implementations, augmented reality renderings can be based at least in part on the data assets. The augmented reality renderings can include product renderings of products sold by a third party.

Figure 7:
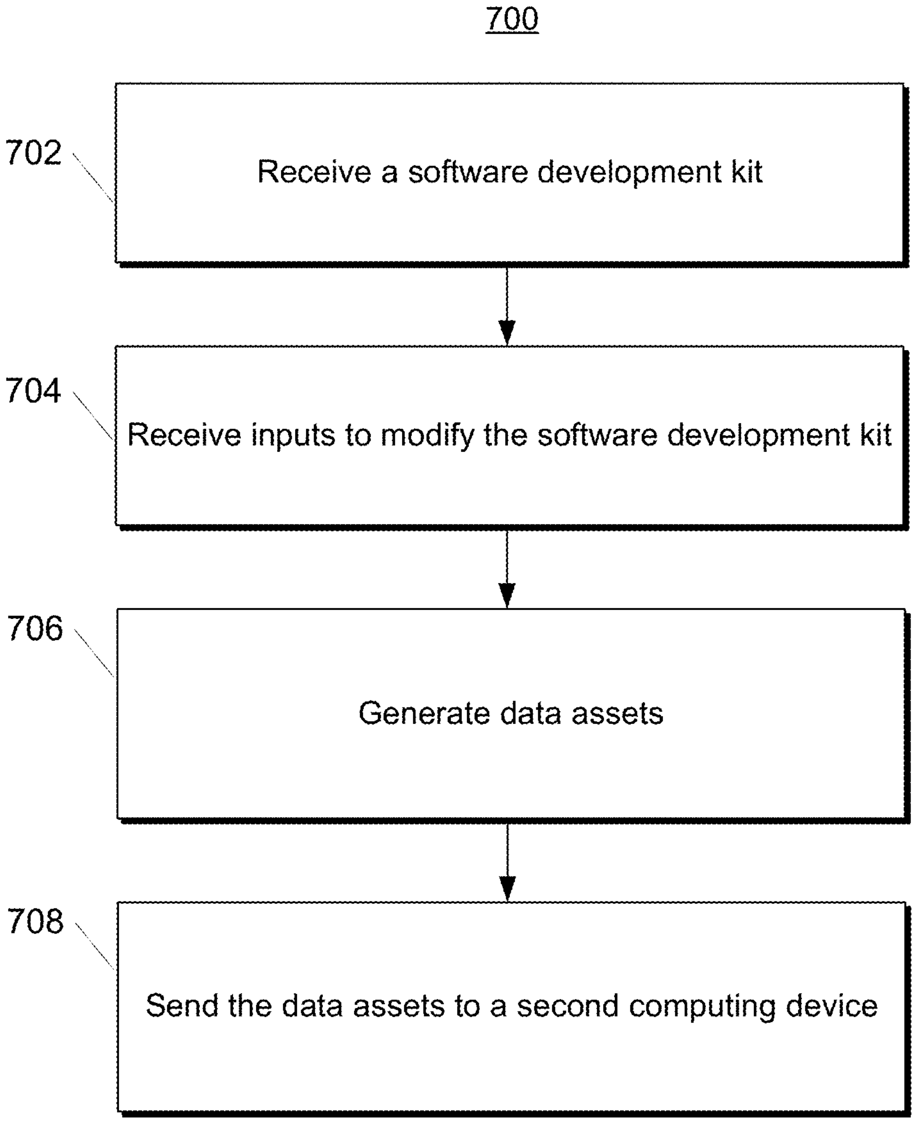
FIG. 7 depicts a flow chart diagram of an example method to perform data asset generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can receive a software development kit. The software development kit can include a template for generating an augmented reality experience. The software development kit may be sent by a facilitating computing system or an intermediary system to compile rendering experiences to provide to a user.

At 704, the computing system can receive inputs to modify the software development kit. Modifying the software development kit can modify the template and can generate a product-specific augmented reality experience. For example, the software development kit can be built and configured to generate a make-up rendering effect. The make-up rendering effect can be implemented into an augmented reality rendering experience for users to "try-on" different lipstick colors or types provided using their personal computing device.

At 706, the computing system can generate data assets. In some implementations, the data assets can be generated based at least in part on the received inputs. The data assets can be converted into a renderable compressed file for sending.

At 708, the computing system can send the data assets to a second computing device. The second computing device may be the sender of the software development kit. In some implementations, the second computing device can be a facilitating computing device or an intermediary computing device that interacts with users to provide the users an augmented reality rendering experience.

Figure 8:
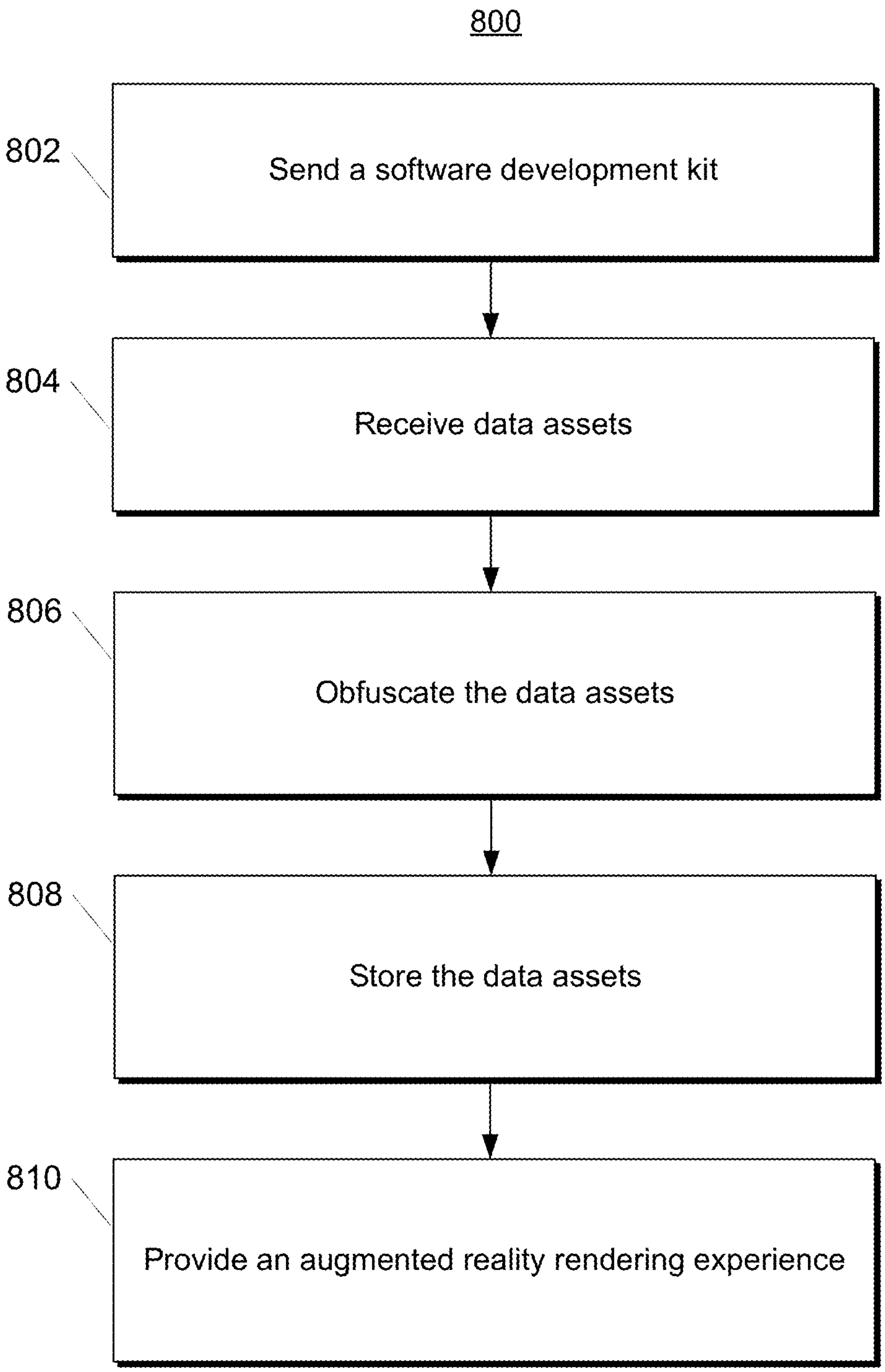
FIG. 8 depicts a flow chart diagram of an example method to perform data asset acquisition and obfuscation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can send a software development kit. In some implementations, the software development kit can include a template for building one or more rendering effect shaders. The base application can be an augmented reality rendering application with example effects and directions for building new renderings or translating previously built rendering effects.

At 804, the computing system can receive data assets. In some implementations, the data assets can include one or more rendering effect shaders built using the software development kit. The data assets can be received as a renderable file.

At 806, the computing system can obfuscate the data assets. Obfuscating the data assets can include removing whitespace from the code, removing comments regarding code semantics, and renaming symbols and terms. The obfuscation can decrease code readability and remove possible proprietary information included in terminology or comments. The obfuscation can help protect the third party builders.

At 808, the computing system can store the data assets. The data assets can be stored locally or via a server. The data assets can be stored to be readily accessible for use with a web application or a mobile application.

At 810, the computing system can provide an augmented reality rendering experience. In some implementations, augmented reality renderings can be based at least in part on the data assets. The augmented reality rendering experience can include providing an experience that augments user images and videos to include rendering effects built by a third party. The rendering effect can be part of a video game or a "live try-on" experience. Moreover, the augmented reality rendering experience can be provided via a web application, a mobile application, or an in store kiosk.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for providing third party data assets to clients, the method comprising:

sending, by a computing system, a software development kit to a plurality of third party computing systems, wherein the software development kit comprises a template for building one or more rendering effect shaders, wherein the software development kit comprises one or more per-product presets, wherein the template and the one or more per-product presets are associated with products in a particular product class, wherein the one or more per-product presets comprise one or more parameters associated with uniform values and textures for the particular product class;

receiving, by the computing system, data assets from the plurality of third party computing systems, wherein each of the data assets comprise one or more rendering effect shaders built using the software development kit, wherein each of the data assets are associated with one or more products of a respective product class;

processing, by the computing system, the data assets to generate obfuscated code;

storing, by the computing system, the obfuscated code associated with the data assets; and providing, by the computing system, an augmented reality rendering experience, wherein augmented reality renderings are based at least in part on the data assets, wherein providing the augmented reality rendering experience comprises processing a user image with a perception subgraph stored by the computing system and a plurality of rendering subgraphs obtained from data assets built by the plurality of third party computing systems to generate an augmented user image comprising a plurality of renderings.

2. The method of claim 1, wherein receiving the data assets comprise receiving one or more rendering subgraphs for the one or more particular products.

3. The method of claim 2, wherein storing, by the computing system, the obfuscated code associated with the data assets comprises: storing, by the computing system, the data assets including the one or more rendering subgraphs.

4. The method of claim 2, wherein the augmented reality rendering is generated by:

receiving a camera feed;

processing the camera feed with a perception subgraph to generate a user mesh; and processing the user mesh with the one or more rendering subgraphs to generate the augmented reality rendering, wherein the augmented reality rendering comprises a rendering of the one or more particular products within the camera feed.

5. The method of claim 1, wherein the software development kit comprises one or more preview tools.

6. The method of claim 1, wherein processing, by the computing system, the data assets to generate obfuscated code comprises:

determining, by the computing system, one or more terms to rename; indexing, by the computing system, the one or more terms;

determining, by the computing system one or more assigned terms for the one or more terms; and renaming, by the computing system, the one or more terms in the code based on the one or more assigned terms, wherein renaming is uniform across multiple instances of the one or more terms.

7. The method of claim 6, wherein renaming, by the computing system, the one or more terms in the code comprises uniform renaming across files.

8. The method of claim 6, wherein renaming the one or more terms in the code of the data assets comprises renaming using a hashing function, wherein generated hashes are indexed in a global registry.

9. The method of claim 1, wherein providing the augmented reality rendering experience comprises utilizing a rendering subgraph associated with the data asset and the perception subgraph usable with a plurality of different data assets associated with the plurality of different renderings.

10. The method of claim 1, wherein providing the augmented reality rendering experience comprises:

obtaining image data;

processing the image data with the perception subgraph of an augmented-reality rendering model to generate a first output, wherein the perception subgraph was generated with the computing system;

processing the first output with a rendering subgraph of the augmented-reality rendering model to generate augmented-reality media, wherein the rendering subgraph is obtained from the data assets obtained from at least one of the plurality of third party computing systems.

11. The method of claim 1, wherein the augmented reality rendering is a video game augmented reality rendering.

12. The method of claim 1, wherein the data assets comprise product data descriptive of a product sold by a third party.

13. The method of claim 1, wherein the augmented reality rendering is generated by:

receiving, by the computing system, user data;

processing, by the computing system, the user data with an encoder model to generate a user mesh; and processing, by the computing system, the user mesh with an augmentation model to generate the augmented reality rendering, wherein the augmentation model comprises shaders based at least in part on the data assets.

14. The method of claim 1, wherein the one or more rendering effect shaders comprise a texture shader, a uniforms shader, and a filtering shader.

15. The method of claim 1, wherein the augmented reality rendering experience comprises a product-specific augmented reality experience, wherein the product-specific augmented reality experience comprises an augmented-reality try-on experience that renders the one or more products in user image data.

16. A computing system, comprising:

one or more processors;

one or more non-transitory computer readable media that collectively store instructions that, when executed by the one or more processors, cause the computing system to perform operations, the operations comprising:

sending a software development kit to a plurality of third party computing systems, wherein the software development kit comprises a template for building one or more rendering effect shaders, wherein the software development kit comprises one or more per-product presets, wherein the template and the one or more per-product presets are associated with products in a particular product class, wherein the one or more per-product presets comprise one or more parameters associated with uniform values and textures for the particular product class;

receiving data assets from the plurality of third party computing systems, wherein each of the data assets comprise one or more rendering effect shaders built using the software development kit, wherein each of the data assets are associated with one or more products of a respective product class;

processing the data assets to generate obfuscated code;

storing the obfuscated code associated with the data assets; and providing an augmented reality rendering experience, wherein augmented reality renderings are based at least in part on the data assets, wherein providing the augmented reality rendering experience comprises processing a user video with a perception subgraph stored by the computing system and a plurality of rendering subgraphs obtained from data assets built by the plurality of third party computing systems to generate an augmented user video comprising a plurality of renderings.

17. The computing system of claim 16, wherein the data assets were generated based at least in part on the one or more inputs received from the third party computing system, wherein generating the data assets based at least in part on the one or more inputs comprises generating a renderable compressed file that comprises the data assets that are associated with rendering a product-specific rendering effect.

18. The computing system of claim 16, further comprising: testing the augmented reality experience, wherein testing the augmented reality experience comprises:

obtaining training data;

processing the training data with the augmented reality experience to generate augmented reality media;

evaluating a loss function based at least in part on a comparison between the augmented reality media and ground truth data; and adjusting one or more parameters based at least in part on the loss function.

19. One or more non-transitory computer readable media that collectively store instructions that, when executed by one or more processors, cause the one or more processors to perform operations, the operations comprising:

sending a software development kit to a plurality of third party computing systems, wherein the software development kit comprises a template for building one or more rendering effect shaders, wherein the software development kit comprises one or more per-product presets, wherein the template and the one or more per-product presets are associated with products in a particular product class, wherein the one or more per-product presets comprise one or more parameters associated with uniform values and textures for the particular product class;

receiving data assets from the plurality of third party computing systems, wherein each of the data assets comprise one or more rendering effect shaders built using the software development kit, wherein each of the data assets are associated with one or more products of a respective product class;

processing the data assets to generate obfuscated code;

storing the obfuscated code associated with the data assets; and providing an augmented reality rendering experience, wherein augmented reality renderings are based at least in part on the data assets, wherein providing the augmented reality rendering experience comprises processing a user video with a perception subgraph stored by the computing system and a plurality of rendering subgraphs obtained from data assets built by the plurality of third party computing systems to generate an augmented user video comprising a plurality of renderings.

20. One or more non-transitory computer readable media of claim 19, wherein the software development kit comprises a joint interface for editing and previewing an augmented reality experience.

* * * * *